United States Patent
Miyazaki

(10) Patent No.: US 10,922,378 B2
(45) Date of Patent: Feb. 16, 2021

(54) SIMULATION METHOD, SIMULATION UNIT, AND PROGRAM

(71) Applicant: SUMITOMO HEAVY INDUSTRIES, LTD., Tokyo (JP)

(72) Inventor: Shuji Miyazaki, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 302 days.

(21) Appl. No.: 16/224,412

(22) Filed: Dec. 18, 2018

(65) Prior Publication Data
US 2019/0197081 A1 Jun. 27, 2019

(30) Foreign Application Priority Data
Dec. 21, 2017 (JP) .............................. JP2017-244708

(51) Int. Cl.
| G06F 17/13 | (2006.01) |
| G06F 30/20 | (2020.01) |
| G06F 30/23 | (2020.01) |
| G06F 111/10 | (2020.01) |

(52) U.S. Cl.
CPC .............. *G06F 17/13* (2013.01); *G06F 30/20* (2020.01); *G06F 30/23* (2020.01); *G06F 2111/10* (2020.01)

(58) Field of Classification Search
None
See application file for complete search history.

(56) References Cited

U.S. PATENT DOCUMENTS

| 2002/0042698 A1 | 4/2002 | Meuris | |
| 2013/0158961 A1* | 6/2013 | Imazawa | G01R 33/1215 703/2 |
| 2015/0127283 A1* | 5/2015 | Miyazaki | G01N 27/72 702/65 |
| 2020/0265328 A1* | 8/2020 | Kaditz | G06N 5/046 |

FOREIGN PATENT DOCUMENTS

| JP | 2012-128490 A | 7/2012 |
| JP | 2016-019457 A | 2/2016 |
| JP | 2017-194884 A | 10/2017 |

OTHER PUBLICATIONS

Search report issued in European Application No. 18212143.4, dated Apr. 30, 2019.

\* cited by examiner

*Primary Examiner* — Craig C Dorais
(74) *Attorney, Agent, or Firm* — Michael Best & Friedrich LLP

(57) ABSTRACT

A change in a current flowing through a current path when a voltage applied to the path is changed is simulated in a system including the path and a member that is acted upon by the current flowing through the path and affects the current flowing through the path. First, the path and the member are represented by aggregates of a plurality of particles. Electromagnetic action from the other particles to each of the plurality of particles configuring the path is calculated based on a current value at a present time of the current flowing through the path and a voltage value of an external voltage applied to the path. The current flowing through the path is calculated based on a calculation result of the electromagnetic action to update the current value flowing through the path from the value at the present time to a value obtained by a calculation.

12 Claims, 7 Drawing Sheets

SIMULATION METHOD, SIMULATION UNIT, AND PROGRAM

RELATED APPLICATIONS

Priority is claimed to Japanese Patent Application No. 2017-244708, filed Dec. 21, 2017, the entire content of which is incorporated herein by reference.

BACKGROUND

Technical Field

Certain embodiments of the present invention relate to a simulation method, a simulation unit, and a program that obtain a temporal change in a current flowing through a current path.

Description of Related Art

A finite element method is commonly used for analyzing a magnetic field of a motor (for example, the related art). For example, in the finite element method, a coil current and magnetization of a magnetic substance are converted into a vector potential, and a repeat calculation is performed before the vector potential converges to a constant value using a determinant relating to the vector potential.

SUMMARY

A calculation time becomes long due to the repeat calculation in the analysis using the finite element method in the related art. According to embodiments of the present invention, there are provided a simulation method, a simulation unit, and a program of a current change suitable for suppressing an increase in the calculation time.

According to an aspect of the present invention, there is provided a simulation method for simulating a change in a current flowing through a current path when a voltage applied to the current path is changed in a system including the current path and a member that is acted upon by the current flowing through the current path and affects the current flowing through the current path. The current path and the member are represented by aggregates of a plurality of particles and a value of the current flowing through the current path is updated from a value at a present time to a value obtained by a calculation by calculating electromagnetic action from the other particles to each of the plurality of particles configuring the current path based on the current value at the present time of the current flowing through the current path and a voltage value of an external voltage applied to the current path and by calculating the current flowing through the current path based on a calculation result of the electromagnetic action.

According to another aspect of the present invention, there is provided a simulation unit having a processor that simulates a change in a current flowing through a current path when a voltage applied to the current path is changed in a system including the current path and a member that is acted upon by the current flowing through the current path and affects the current flowing through the current path. The processor has a function of acquiring parameters for specifying shapes and a relative position relation of the current path and the member from an input section, a function of representing the current path and the member by aggregates of a plurality of particles based on the input parameters, and a function of updating a value of the current flowing through the current path from a value at a present time to a value obtained by a calculation by calculating electromagnetic action from the other particles to each of the plurality of particles configuring the current path based on the current value at the present time of the current flowing through the current path and a voltage value of an external voltage applied to the current path and by calculating the current flowing through the current path based on a calculation result of the electromagnetic action.

According to still another aspect of the present invention, there is provided a computer readable medium storing a program that causes a computer to realize a function of simulating a change in a current flowing through a current path when a voltage applied to the current path is changed in a system including the current path and a member that is acted upon by the current flowing through the current path and affects the current flowing through the current path. The function has a function of acquiring parameters for specifying shapes and a relative position relation of the current path and the member from an input section, a function of representing the current path and the member by aggregates of a plurality of particles based on the input parameters, and a function of updating a value of the current flowing through the current path from a value at a present time to a value obtained by a calculation by calculating electromagnetic action from the other particles to each of the plurality of particles configuring the current path based on the current value at the present time of the current flowing through the current path and a voltage value of an external voltage applied to the current path and by calculating the current flowing through the current path based on a calculation result of the electromagnetic action.

It is possible to reduce a calculation load required for the simulation and to suppress the increase in the calculation time.

DETAILED DESCRIPTION

Figure 1A:
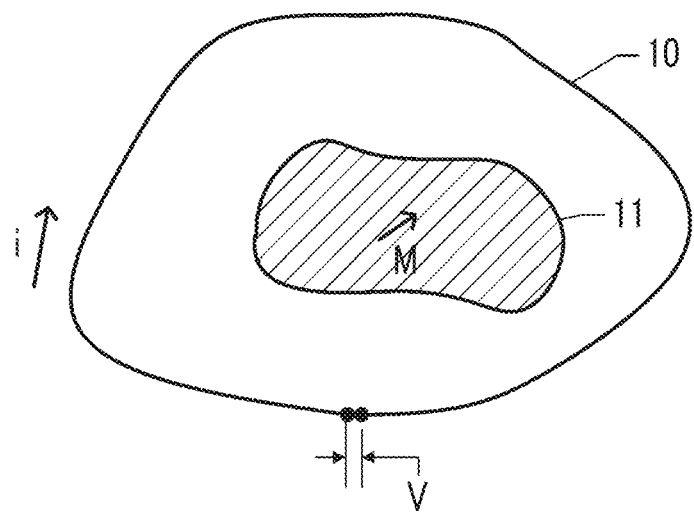
FIG. 1A is a schematic view of a system of simulation targets.

A system of simulation targets will be described with reference to FIGS. 1A and 1B. FIG. 1A is a schematic view of the system of the simulation targets. The system of the simulation targets includes a current path 10 configuring a coil and a member 11. The member 11 is acted upon by a current flowing through the current path 10 and affects the current flowing through the current path 10 as a result.

For example, in a case where the member 11 is formed by a conductor, when the current flowing through the current path 10 changes with time, a magnetic field generated by the current changes and an eddy current flows in the member 11. The eddy current affects the current path 10, and thus the current flowing through the current path 10 is changed. In a case where the member 11 is a magnetic substance, magnetization M is generated in the member 11 under action from the magnetic field generated by the current flowing through the current path 10. A change in the magnetization M affects the current path 10, and thus the current flowing through the current path 10 is changed.

Further, when the current flowing through the current path 10 is changed, the eddy current is generated in the current path 10 itself. The eddy current generated in the current path 10 affects another point of the current path 10, and thus the current flowing through the current path 10 is changed.

Since the current path 10 and the member 11 mutually exert electromagnetic action in this manner and the action is commonly nonlinear, it is difficult to analytically obtain a change in the current when an external voltage to be applied to the current path 10 changes. In embodiments described below, the current path 10 and the member 11 are represented by aggregates of a plurality of particles and an electromagnetic interaction between the particles is numerically calculated to perform a coupled analysis between the magnetic field and an electric circuit. As an example, the change in the current when the external voltage to be added to the current path 10 changes is obtained.

Figure 1B:
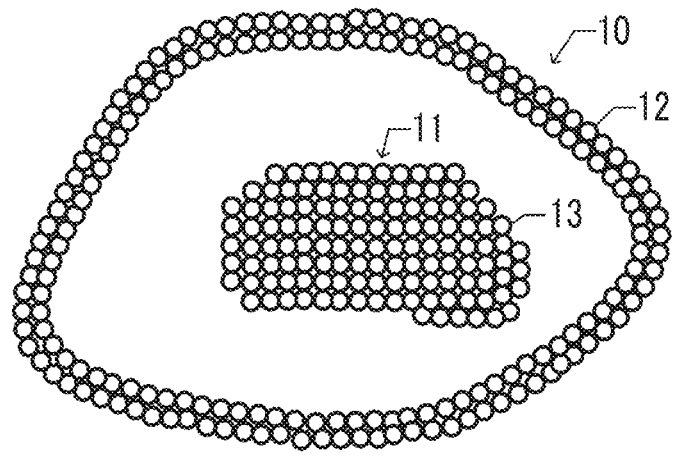
FIG. 1B is a view of a current path and a member represented by aggregates of a plurality of particles.

FIG. 1B is a view of the current path 10 represented by the aggregate of a plurality of particles 12 and the member 11 represented by aggregates of a plurality of particles 13. When the external voltage to be applied to the current path 10 is represented by V (FIG. 1A), the current flowing through the current path 10 is represented by i (FIG. 1A), magnetic flux interlinked with the current path 10 is represented by φ, and resistance of the current path 10 is represented by R, a voltage equation is represented as follows.

Formula 1

$$V = Ri + \frac{d\phi}{dt} \quad (1)$$

The magnetic flux φ interlinked with the current path 10 is represented by the following formula.

Formula 2

$$\phi = \frac{N}{S} \sum_j (A_{c,j}(i) + A_{m,j}(i) + A_{e,j}(i)) \cdot n_j \Delta V_j \quad (2)$$

Here, N is the number of turns of the coil configured of the current path 10, S is a coil cross-sectional area of the coil configured of the current path 10, Ac, j (i) is a contribution from the current flowing through the current path 10 in a vector potential acting on a j-th particle, Am, j (i) is a contribution from the magnetization of the particle 13 of the member 11 in the vector potential acting on the j-th particle, Ae, j (i) is a contribution from the eddy currents flowing through the particle 12 of the current path 10 and the particle 13 of the member 11 in the vector potential acting on the j-th particle, nj is a unit vector in a direction of the current flowing through the j-th particle, and ΔVj is the volume of the j-th particle. The sum symbol Σ means that the sum is taken for the particle 12 configuring the current path 10.

The vector potentials Ac, j (i), Am, j (i), and Ae, j (i) are functions of a current i flowing through the current path 10. The vector potentials Ac, j (i), Am, j (i), and Ae, j (i) can be calculated by a magnetic beads method disclosed in, for example, the related art.

Most induction motors and the like are a voltage driven type. In this case, it is necessary to calculate the current i that satisfies the following formula.

Formula 3

$$0 = V_0 - Ri - \frac{d\phi}{dt} \quad (3)$$

Here, V0 is the external voltage to be applied to the current path 10 from the outside. Since the third term on the right side of Formula 3 has nonlinearity, it is impossible to analytically derive a solution. In a case of using the finite element method, a calculation time becomes long by performing the repeat calculation using a determinant relating to the vector potential before a vector potential value converges.

In the embodiment, the current is calculated by a dynamical method. Formula 3 is replaced by the following ordinary differential equation.

Formula 4

$$m_v \frac{d^2 i}{dt^2} = V_0 - Ri - \frac{d\phi}{dt} \quad (4)$$

Here, mv is virtual mass. Formula 4 is equivalent to a forced oscillation equation having an attenuation term. The first term on the right side of Formula 4 (external voltage V0) corresponds to external force, the second term thereon (voltage drop Ri due to current flowing through current path 10) corresponds to an oscillation term, and the third term thereon (dφ/dt) corresponds to the attenuation term. Resistance R of the current path 10 corresponds to a spring constant.

When a constant is given as the external voltage V0 in Formula 4 to solve the ordinary differential equation, the current i converges to a constant value while oscillating. Since a value on the left side of Formula 4 becomes zero in a state where the current i converges to the constant value, Formula 4 matches Formula 3. That is, obtaining a convergence value of the current i by solving Formula 4 is equivalent to obtaining a current value i satisfying Formula 3. In general, it is necessary to perform the repeat calculation in order to obtain the convergence value of the current i. However, when virtual mass mv and a time interval width Δt are sufficiently small, the convergence of the current i is accelerated and the number of the repeat calculations can be reduced.

In this manner, it is possible to obtain the current i satisfying Formula 3 by numerically solving the ordinary differential equation of Formula 4. The leapfrog method, the Euler method, the Runge-Kutta method can be employed for the numerical analysis of the ordinary differential equation.

When the leapfrog method is employed as an example, the following equations are obtained by discretizing Formula 4.

Formula 5

$$\frac{di}{dt}\left(n+\frac{1}{2}\right) = \frac{di}{dt}\left(n-\frac{1}{2}\right) + F_c(n) \cdot \frac{\Delta t}{m_v} \quad (5)$$

Formula 6

$$i(n+1) = i(n) + \frac{di}{dt}\left(n+\frac{1}{2}\right) \cdot \Delta t \quad (6)$$

Formula 7

$$F_c(n) \equiv V_0 - Ri(n) - \frac{d\phi}{dt}(n) \quad (7)$$

Here, n in parentheses is a positive integer representing the number of the repeat calculations, and $\Delta t$ is the time interval width.

A temporal change of the current i can be obtained by repeatedly calculating Formulas 5 and 6 before the current i converges every time the external voltage V0 is updated while the external voltage V0 is changed by a time interval width $\Delta T$. The time interval width $\Delta t$ of Formula 5 is a time interval width given for numerically solving Formula 4 for convenience and is independent of the time interval width $\Delta T$ that changes the external voltage V0. When the virtual mass mv and the time interval width $\Delta T$ are sufficiently small, it is possible to reduce the number of the repeat calculations to be executed every time the external voltage V0 is updated.

Figure 2:
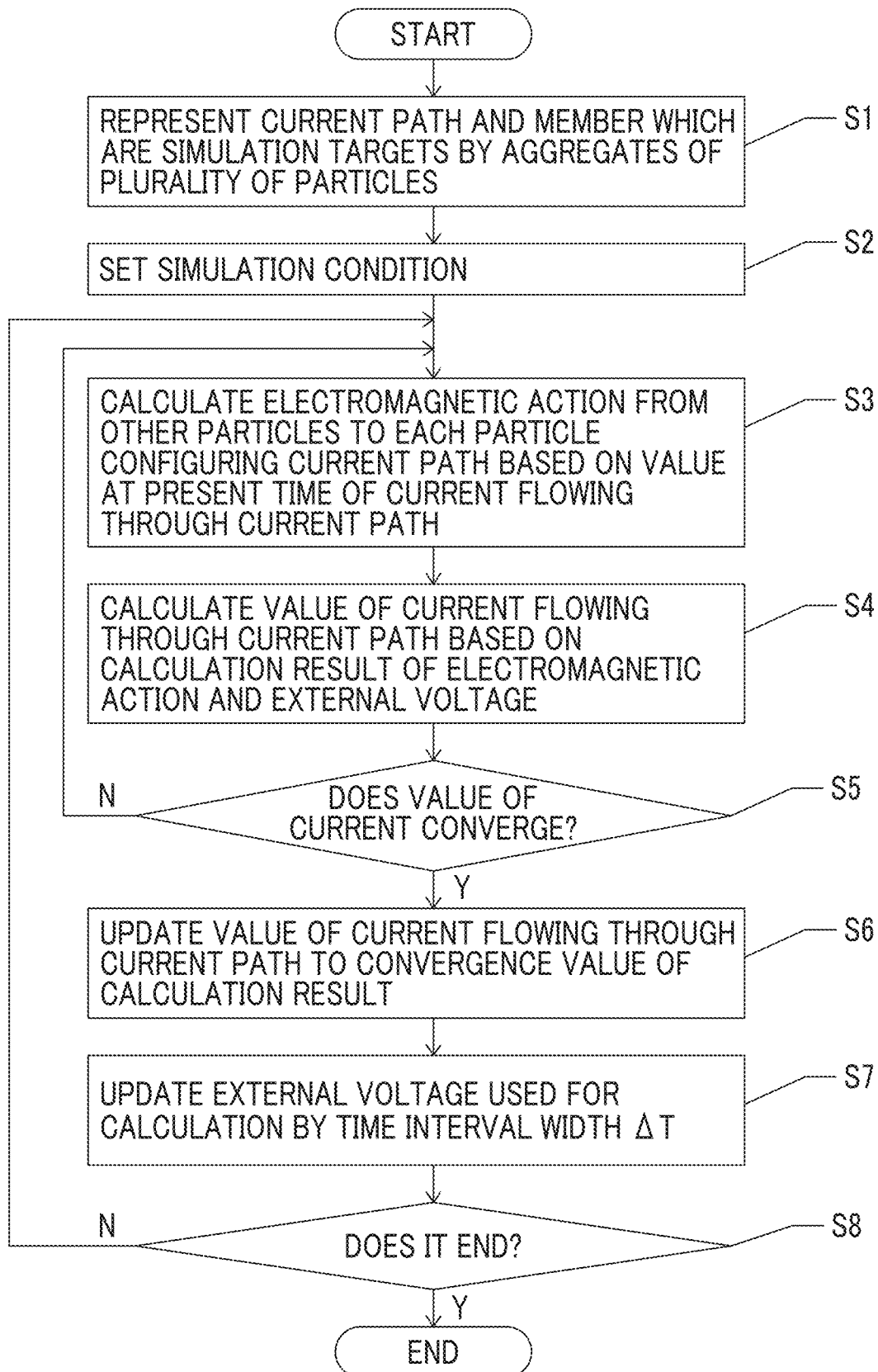
FIG. 2 is a flowchart of a simulation method according to an embodiment.

Next, a simulation method according to the embodiment will be described with reference to FIG. 2. FIG. 2 is a flowchart of the simulation method according to the embodiment. First, the current path 10 and the member 11 which are the simulation targets are represented by the aggregates of the plurality of particles based on shapes and a relative position relation of the current path 10 and the member 11 (FIG. 1A) which are the simulation targets (step S1). For example, coordinates and the volumes of the plurality of particles 12 of the current path 10 (FIG. 1B) and the plurality of particles 13 of the member 11 (FIG. 1B) in a virtual space are decided.

Further, a simulation condition is set (step S2). For example, the temporal change in the external voltage V0 to be applied to the current path 10, an initial value of the current i flowing through the current path 10, electrical conductivity of the current path 10, the number of turns of the coil configured of the current path 10, electrical conductivity and permeability of the member 11, and the like are set.

Next, the electromagnetic action from the other particles 12 and 13 to each of the plurality of particles 12 configuring the current path 10 (FIG. 1B) is calculated based on a value at the present time of the current i flowing through the current path 10 (step S3). For example, the vector potentials Ac, j (i), Am, j (i), and Ae, j (i) represented by Formula 2 are calculated.

Next, a value of the current flowing through the current path 10 is calculated based on a calculation result of the electromagnetic action and the external voltage V0 (step S4). Specifically, the external voltage V0 is given and Formulas 5 and 6 are used to calculate a current value i (n+1) after the time interval width $\Delta t$ elapses. Thereafter, it is determined whether the calculated current value i (n+1) converges (step S5). In a case where the current value does not converge, steps S3 and S4 are repeatedly executed with the calculated current value i (n+1) as the value at the present time. The external voltage V0 remains unchanged during the repeat execution of steps S3 and S4.

In a case where the calculated value i (n+1) converges, the value of the current flowing through the current path 10 is updated to a converged value (step S6). Thereafter, the external voltage V0 used for the calculation is updated to a value after the time interval width $\Delta T$ (step S7).

Processes from step S3 to step S7 are repeated until the simulation ends (step S8). For example, the simulation ends when the external voltage V0 is updated a predetermined number of times.

Next, a simulation unit according to the embodiment will be described with reference to FIG. 3. The simulation unit according to the embodiment includes a program that causes a computer to execute the simulation method shown in FIG. 2 and executes the program.

Figure 3:
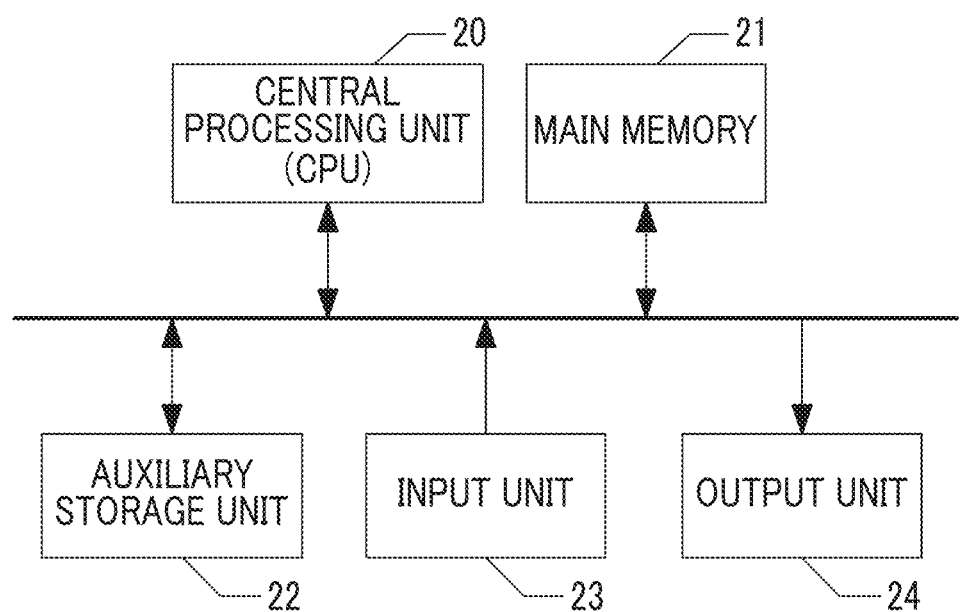
FIG. 3 is a block diagram of a simulation unit according to the embodiment.

FIG. 3 is a block diagram of the simulation unit according to the embodiment. The computer executing a simulation program may be used as the simulation unit. The computer includes a central processing unit (CPU) 20, a main memory 21, an auxiliary storage unit 22, an input unit 23, and an output unit 24. An input section such as a keyboard, a pointing device, a communication unit (reception unit), or a reading unit of removable media may be used as the input unit 23. An output section such as a display, a printer, a communication unit (transmission unit), or a writing unit for removable media may be used as the output unit 24.

The auxiliary storage unit 22 includes a recording medium storing the simulation program. The recording medium may be built in the auxiliary storage unit 22 or may be the removable media detachable from the auxiliary storage unit 22. The simulation program is loaded in the main memory 21 and executed by the CPU 20. A processor including the program and the CPU 20 has a function of executing each process shown in FIG. 2. The program causes the computer to execute the above functions.

Information required for the simulation is input from the input unit 23. For example, various simulation conditions decided in steps S1 and S2 (FIG. 2) are input. A value input by a user of the simulation unit is not necessarily to be parameter values themselves configuring these simulation conditions and may be parameters for specifying these values. In this case, the CPU 20 calculates the parameter configuring the simulation based on the input parameter.

The CPU 20 acquires the simulation condition and the like input from the input unit 23. Further, the CPU 20 outputs a simulation result to the output unit 24. For example, the CPU 20 displays the temporal change in the current value obtained in step S6 (FIG. 2) on the output unit 24 as an image (for example, graph). The temporal change in the external voltage V0 set in step S2 may be displayed together with the simulation result.

Next, an actual simulation result using the simulation method according to the embodiment will be described with reference to FIG. 4A to FIG. 5B.

Figure 4A:
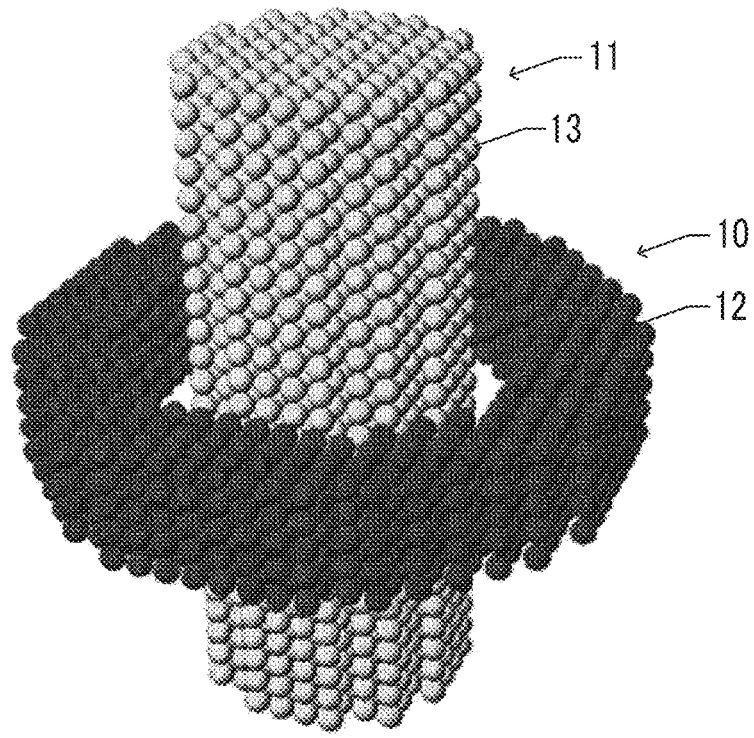
FIGS. 4A and 4B are a perspective view and a schematic view as viewed from the top of the aggregates of the particles when the current path and the member which are the simulation targets are respectively represented by the aggregates of the plurality of particles.
Figure 4B:
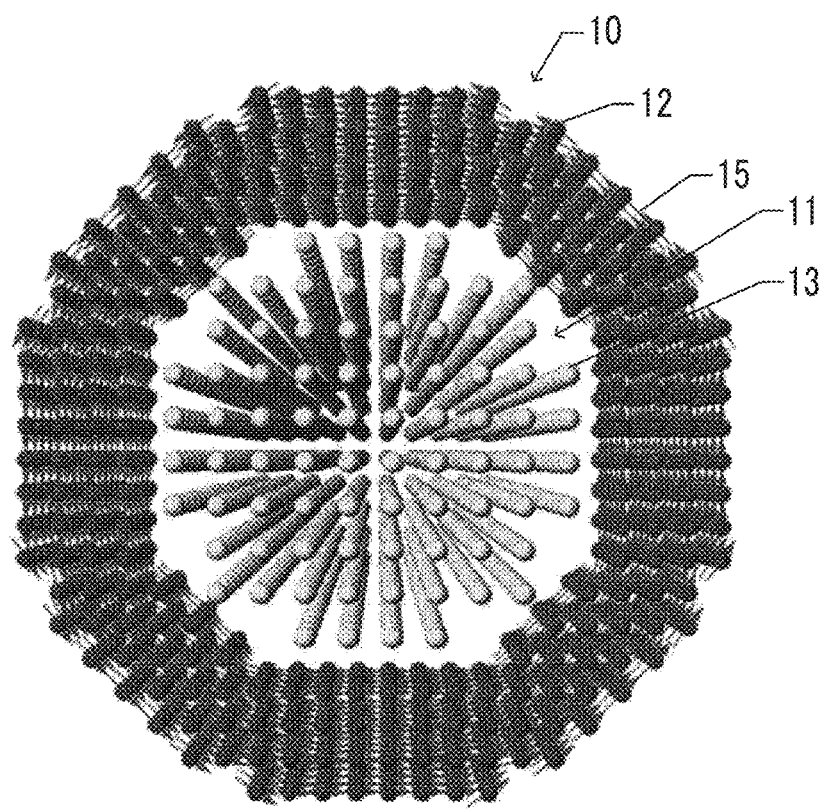

FIGS. 4A and 4B are a perspective view and a schematic view as viewed from the top of the aggregates of the particles when the current path 10 and the member 11 which are the simulation targets are respectively represented by the aggregates of the plurality of particles 12 and 13. The current path 10 is wound around a columnar member 11 made of a magnetic material, and the current path 10 configures the coil interlinked with the member 11.

A sinusoidal external voltage having root-mean-square amplitude of 20 V and a frequency of 50 Hz is applied to the current path 10 configuring the coil. The number of turns of the coil configured of the current path 10 is set to 150 times, and the resistance thereof is set to 0.4Ω. The permeability of the member 11 made of the magnetic material is set to 1000. It is assumed that the current flowing through the current path 10 has only a component flowing in the circumferential direction and does not have a component in the axial direction of the member 11. In FIG. 4B, a current flowing direction is indicated by an arrow 15 for each particle 12 of the current path 10.

Figure 5A:
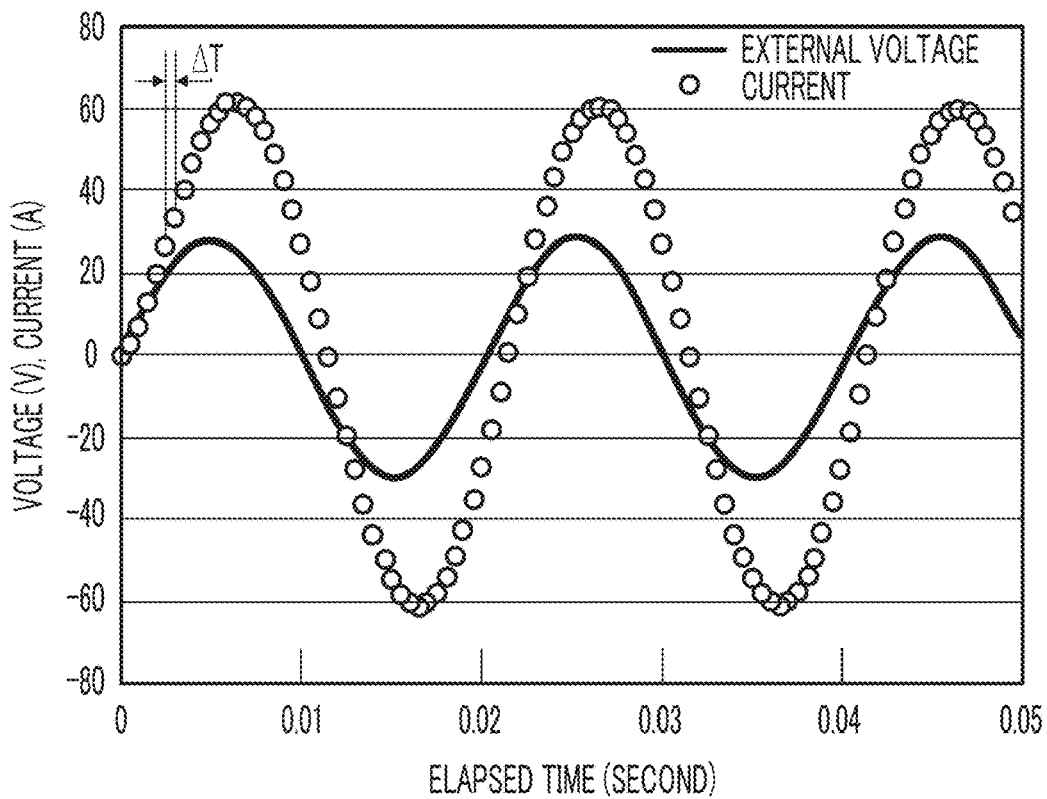
FIG. 5A is a graph showing a simulation result when a simulation is performed by a method according to the embodiment.

The current flowing through the current path 10 is actually obtained by the simulation. FIG. 5A is a graph showing the simulation result. The horizontal axis represents an elapsed time in the unit of "second", and the vertical axis represents the voltage and the current in the units of "V" and "A", respectively. In FIG. 5A, the external voltage applied to the current path is represented by a solid line, and the current value obtained by the simulation is represented by a circle symbol. The time interval width ΔT updating the external voltage V0 (step S7 in FIG. 2) is set to ⅟25 of one period of a voltage waveform.

Figure 5B:
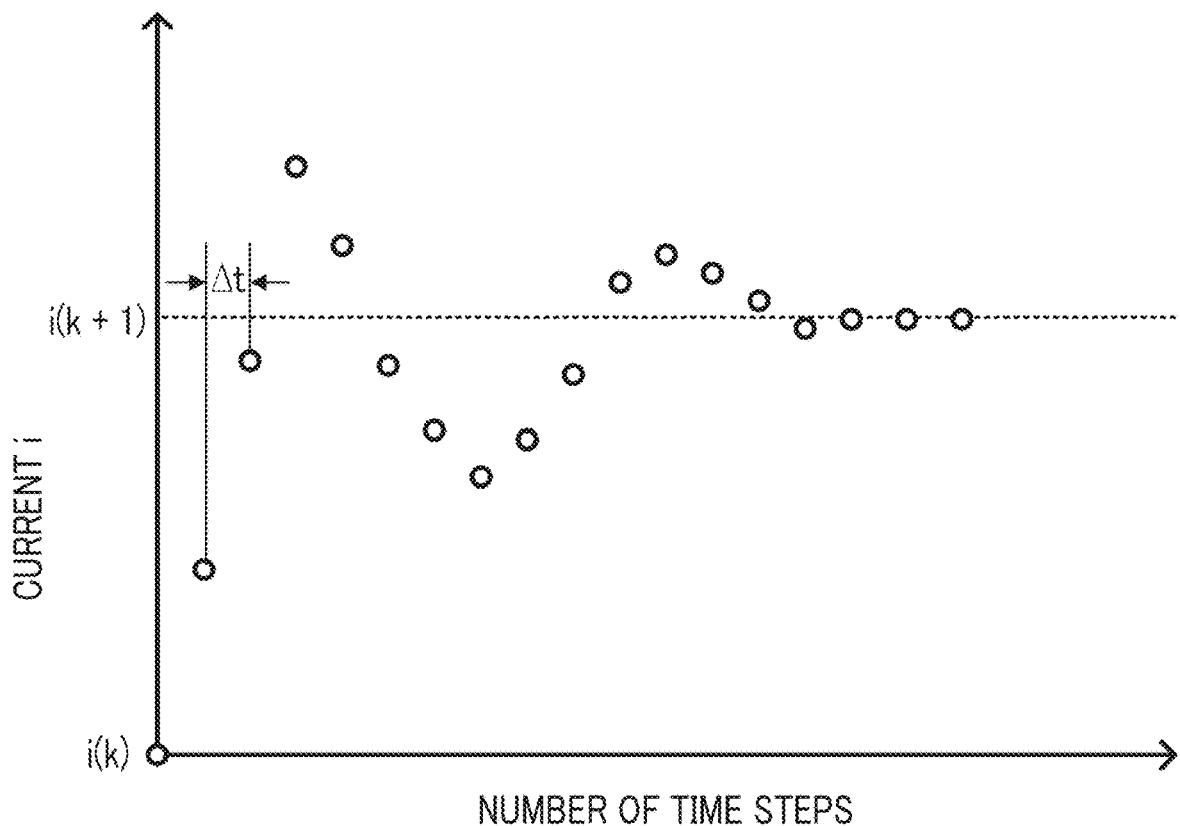
FIG. 5B is a graph showing an example of a state where a calculation value of a current flowing through the current path approaches a convergence value i (k+1) from a current value i (k) at the present time by repeatedly executing steps S3 and S4 (FIG. 2).

FIG. 5B is a graph showing an example of a state where a calculation value of the current flowing through the current path approaches a convergence value i (k+1) from a current value i (k) at the present time by repeatedly executing steps S3 and S4 (FIG. 2). The horizontal axis represents the number of repetitions of steps S3 and S4 (the number of time steps), and the vertical axis represents the current value calculated for each repeat calculation. The current value calculated by Formulas 5 and 6 is attenuated while oscillating and converges to the convergence value i (k+1) by fixing the external voltage V0 in Formula 7 and repeatedly executing steps S3 and S4. The time interval width Δt of the repeat calculation (FIG. 5B) corresponds to the time interval width Δt of Formulas 5 and 6. The convergence value i (k+1) corresponds to the current value after the time interval width ΔT shown in FIG. 5A.

When a changed variable of the external voltage V0 updated in step S7 becomes large, the calculation result may diverge in numerical analysis. In order to prevent the divergence, an artificial attenuation term is added to Formula 7 in actual calculation. The changed variable of the calculation result of the current is assumed to be equal to or less than 0.01 A as a convergence determination condition in step S5 (FIG. 2).

A phase difference between the external voltage and the current occurs as shown in FIG. 5A. The phase difference is caused by counter-electromotive force generated by the change in the magnetic flux interlinked with the coil.

Next, excellent effects obtained by the simulation method according to the embodiment will be described. In the simulation method according to the embodiment, it is possible to obtain the temporal change in the current without performing the repeat calculation using the determinant relating to the vector potential as compared with the case of solving Formula 3 using the finite element method. It is possible to accelerate the convergence in the repeat calculation in steps S3 and S4 (FIG. 2) by setting the virtual mass mv in Formula 4 to be sufficiently small. Accordingly, it is possible to achieve the reduction of the calculation time.

Next, a simulation method according to another embodiment will be described with reference to FIGS. 6 to 7B.

Hereinafter, a description of a configuration common to the simulation method according to the embodiment shown in FIG. 2 is omitted.

Figure 6:
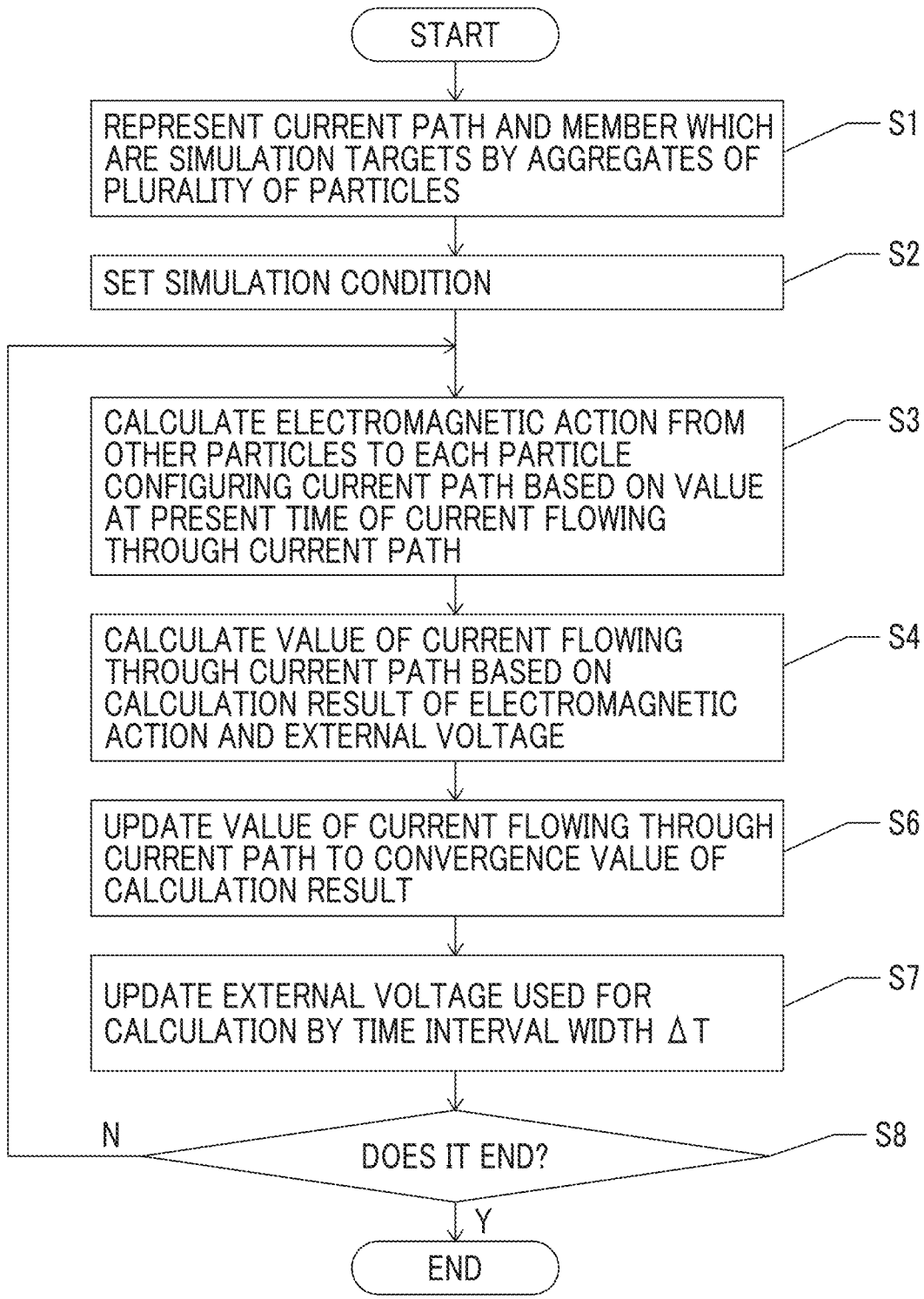
FIG. 6 is a flowchart of a simulation method according to another embodiment.

FIG. 6 is a flowchart of the simulation method according to the embodiment. In the embodiment, the time interval width ΔT when the external voltage V0 is updated in step S7 is made shorter than the time interval width ΔT employed in the embodiment shown in FIG. 2. Therefore, the changed variable of the external voltage V0 per one time step becomes small. In the embodiment shown in FIG. 2, when the changed variable of the external voltage V0 is small, the current value quickly converges at the time of the repeat process of steps S3 and S4. As a result, it is possible to obtain the effect of reducing the number of repetitions of steps S3 and S4. In the embodiment, the time interval width ΔT is made sufficiently shorten to such an extent that the current value substantially approaches the convergence value merely by executing steps S3 and S4 once. Therefore, the determination of the current value convergence (step S5 in FIG. 2) is not performed after steps S3 and S4 are executed in the embodiment as shown in FIG. 6.

Further, the virtual mass mv in Formula 4 is made sufficiently small in order to bring the current value close to the convergence value merely by executing steps S3 and S4 once in the embodiment. Preferable magnitude of the virtual mass my can be decided by executing a plurality of times of simulations by changing the virtual mass mv. In this manner, the number of time steps when the forced oscillation equation (4) is numerically solved is once in the embodiment.

Next, an actual simulation result using the simulation method according to the embodiment will be described with reference to FIGS. 7A and 7B. The simulation target is the same as those shown in FIGS. 4A and 4B, and the initial condition is the same as those shown in FIG. 5A and FIG. 5B.

Figure 7A:
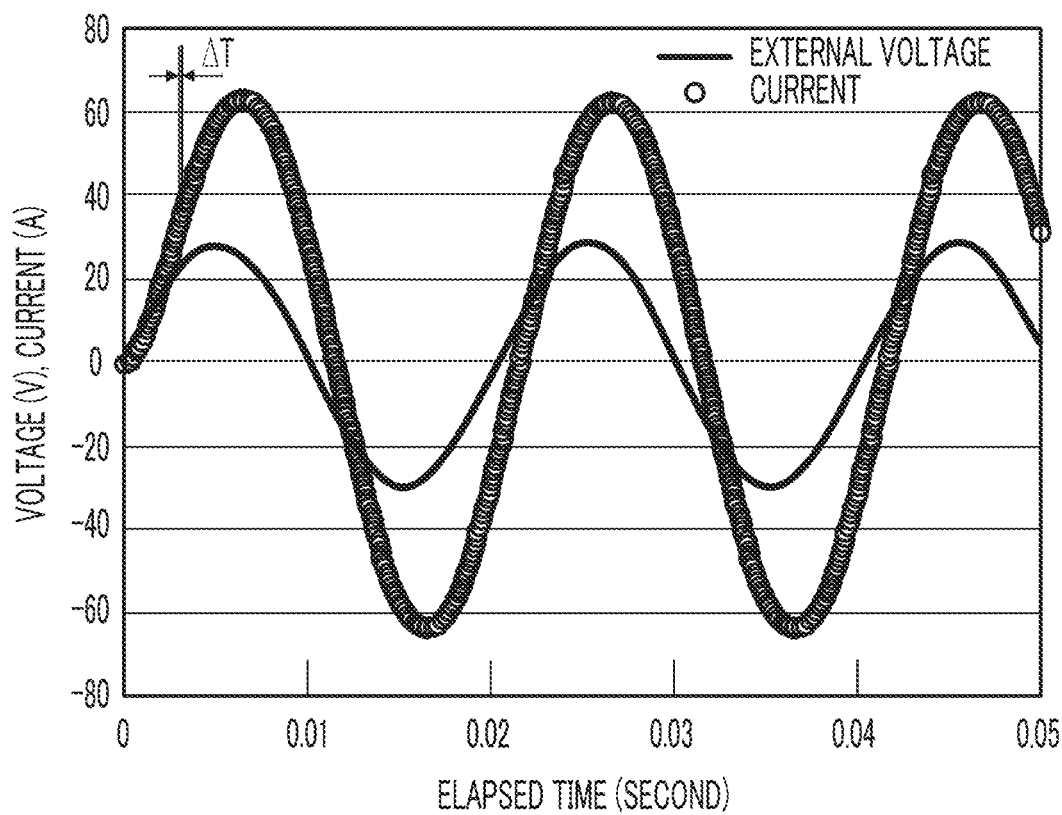
FIG. 7A is a graph showing a simulation result when the simulation is performed by the method according to the embodiment shown in FIG. 6.

FIG. 7A is a graph showing the simulation result. The horizontal axis represents the elapsed time in the unit of "second", and the vertical axis represents the voltage and the current in the units of "V" and "A", respectively. In FIG. 7A, the external voltage V0 applied to the current path 10 is represented by a solid line, and the current obtained by the simulation is represented by a circle symbol. The time interval width ΔT updating the external voltage V0 in step S7 (FIG. 6) is set to ⅟2000 of a period of a voltage waveform. That is, the time interval width ΔT is set to $1 \times 10^{-5}$ second.

Figure 7B:
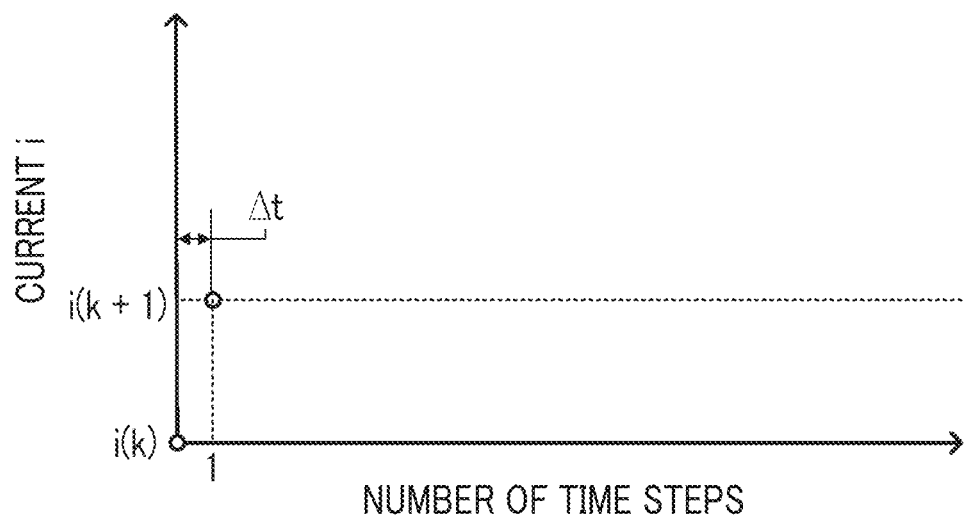
FIG. 7B is a graph showing an example of a change in a current value obtained by executing steps S3 and S4 (FIG. 6).

FIG. 7B is a graph showing the change in the current value obtained by executing steps S3 and S4 (FIG. 6). The horizontal axis represents the number of repetitions of steps S3 and S4 (the number of time steps when oscillation equation (4) is numerically solved), and the vertical axis represents the current value. In the embodiment, steps S3 and S4 are executed once based on the current value i (k) at the present time to obtain the convergence value i (k+1) of the current.

When the temporal change in the current value obtained in the embodiment (FIG. 7A) is compared with the temporal change in the current value obtained in the embodiment shown in FIG. 2 (FIG. 5A), both temporal changes are substantially equal to each other. An error in both temporal changes is actually equal to or less than 3%.

In the embodiment shown in FIG. 6, a time required for calculation for one wavelength of voltage is approximately ⅟40 as compared with the embodiment shown in FIG. 2. This is because the processes in steps S3 and S4 are not repeated. In this manner, it is possible to further reduce the calculation time by employing the embodiment shown in FIG. 6.

It should be understood that each embodiment described above is an example and a partial replacement or a combination of the configurations shown in the different embodiments is possible. The same action effect by the same configuration in the plurality of embodiments is not consecutively mentioned for each embodiment. Further, the invention is not limited to the above-described embodiment. For example, it will be obvious to those skilled in the art that various modifications, improvements, combinations, and the like can be made.

What is claimed is:

1. A simulation method for simulating a change in a current flowing through a current path when a voltage applied to the current path is changed in a system including the current path and a member that is acted upon by the current flowing through the current path and affects the current flowing through the current path, the method comprising:
    representing the current path and the member by aggregates of a plurality of particles; and
    updating a value of the current flowing through the current path from a value at a present time to a value obtained by a calculation by calculating electromagnetic action from the other particles to each of the plurality of particles configuring the current path based on the current value at the present time of the current flowing through the current path and a voltage value of an external voltage applied to the current path and by calculating the current flowing through the current path based on a calculation result of the electromagnetic action.

2. The simulation method according to claim 1, further comprising:
    calculating a vector potential caused by the current flowing through the particle configuring the current path, a vector potential caused by eddy currents flowing through the particles configuring the current path and the member, and a vector potential caused by magnetization of the particle configuring the member, as the electromagnetic action.

3. The simulation method according to claim 1, further comprising:
    numerically solving an oscillation equation of the current where the external voltage is external force, a voltage drop due to the current flowing through the current path is an oscillation term, and the electromagnetic action is an attenuation term to calculate the current flowing through the current path.

4. The simulation method according to claim 3,
    wherein the number of time steps that numerically solves the oscillation equation is set to once corresponding to a change in the external voltage once.

5. A simulation unit comprising:
    a processor that simulates a change in a current flowing through a current path when a voltage applied to the current path is changed in a system including the current path and a member that is acted upon by the current flowing through the current path and affects the current flowing through the current path,
    wherein the processor has a function of acquiring parameters for specifying shapes and a relative position relation of the current path and the member from an input section,
    a function of representing the current path and the member by aggregates of a plurality of particles based on the input parameters, and
    a function of updating a value of the current flowing through the current path from a value at a present time to a value obtained by a calculation by calculating electromagnetic action from the other particles to each of the plurality of particles configuring the current path based on the current value at the present time of the current flowing through the current path and a voltage value of an external voltage applied to the current path and by calculating the current flowing through the current path based on a calculation result of the electromagnetic action.

6. The simulation unit according to claim 5,
    wherein the processor calculates a vector potential caused by the current flowing through the particle configuring the current path, a vector potential caused by eddy currents flowing through the particles configuring the current path and the member, and a vector potential caused by magnetization of the particle configuring the member, as the electromagnetic action.

7. The simulation unit according to claim 5,
    wherein the processor numerically solves an oscillation equation of the current where the external voltage is external force, a voltage drop due to the current flowing through the current path is an oscillation term, and the electromagnetic action is an attenuation term to calculate the current flowing through the current path.

8. The simulation unit according to claim 7,
    wherein the processor sets the number of time steps that numerically solves the oscillation equation to once corresponding to a change in the external voltage once.

9. A computer readable medium storing a program that causes a computer to realize a function of simulating a change in a current flowing through a current path when a voltage applied to the current path is changed in a system including the current path and a member that is acted upon by the current flowing through the current path and affects the current flowing through the current path, the function comprising:
    a function of acquiring parameters for specifying shapes and a relative position relation of the current path and the member from an input section;
    a function of representing the current path and the member by aggregates of a plurality of particles based on the input parameters; and
    a function of updating a value of the current flowing through the current path from a value at a present time to a value obtained by a calculation by calculating electromagnetic action from the other particles to each of the plurality of particles configuring the current path based on the current value at the present time of the current flowing through the current path and a voltage value of an external voltage applied to the current path and by calculating the current flowing through the current path based on a calculation result of the electromagnetic action.

10. The computer readable medium storing the program according to claim 9, the function further comprising:
    a function of calculating a vector potential caused by the current flowing through the particle configuring the current path, a vector potential caused by eddy currents flowing through the particles configuring the current path and the member, and a vector potential caused by magnetization of the particle configuring the member, as the electromagnetic action.

11. The computer readable medium storing the program according to claim 9, the function further comprising:

a function of numerically solving an oscillation equation of the current where the external voltage is external force, a voltage drop due to the current flowing through the current path is an oscillation term, and the electromagnetic action is an attenuation term to calculate the current flowing through the current path.

12. The computer readable medium storing the program according to claim 11,
wherein the number of time steps that numerically solves the oscillation equation is set to once corresponding to a change in the external voltage once.

* * * * *